United States Patent [19]

Bernardon

[11] Patent Number: 4,651,659
[45] Date of Patent: Mar. 24, 1987

[54] APPARATUS FOR CONTROLLING THE SHAPE OF A FLEXIBLE SPLINE

[75] Inventor: Edward Bernardon, Cambridge, Mass.

[73] Assignee: The Charles Stark Draper Laboratory, Inc., Cambridge, Mass.

[21] Appl. No.: 869,088

[22] Filed: May 30, 1986

[51] Int. Cl.$^4$ ............................................. D05B 3/00
[52] U.S. Cl. ........................... 112/121.11; 112/121.14; 112/308
[58] Field of Search ...................... 112/121.14, 121.11, 112/121.12, 121.15, 308, 309

[56] References Cited

U.S. PATENT DOCUMENTS

| | | | |
|---|---|---|---|
| 4,318,356 | 3/1982 | Beisler | 112/121.14 |
| 4,457,243 | 7/1984 | Bowditch | 112/121.14 |
| 4,467,736 | 8/1984 | Perlino | 112/121.15 X |
| 4,512,269 | 4/1985 | Bowditch | 112/121.14 |

Primary Examiner—H. Hampton Hunter
Attorney, Agent, or Firm—Lahive & Cockfield

[57] ABSTRACT

An apparatus for controlling the shape of an elongated flexible spline to substantially match a third order polynomial curve extending between first and second end points where the spline extends along a deformable central axis. A spline support member extends along the central axis. The spline is pivotably coupled to the support member at a first point along said central axis, and is slidingly coupled to the support member at second, third and fourth points along the central axis. The support member establishes a first predetermined distance (L) along a reference line passing through the interior two of said first, second, third and fourth points. A first spline deflector selectively deflects one of the exterior two of the first, second, third and fourth points by a distance $D_L$ in a direction perpendicular to the reference line. A second spline deflector selectively deflects the other of the exterior two of the first, second, third and fourth points by a distance $D_R$ in a direction perpendicular to the reference line. A controller controls the first and second spline deflectors so that the central axis of the spline is deformed and the intermediate two points substantially match points of the polynomial curve and so that the exterior two points are offset with respect to the reference line and the spline central axis overlies the first and second end points of the curve.

6 Claims, 4 Drawing Figures

APPARATUS FOR CONTROLLING THE SHAPE OF A FLEXIBLE SPLINE

REFERENCE TO RELATED APPLICATIONS

The subject matter of this application is related to that of U.S. patent application Ser. No. 707,608, entitled "Assembly System for Seamed Articles", filed Mar. 4, 1985, assigned to the assignee of the present application. That application Ser. No. 707,608 is incorporated herein by reference.

BACKGROUND OF THE INVENTION

This invention relates to the assembly of seamed articles made from limp material, such as fabric. In particular, the invention relates to an apparatus for supporting fabric gripping elements along a deformable axis corresponding to a predetermined contour on a limp fabric segment.

Conventional assembly line manufacture of seamed articles constructed of limp fabric consists of a series of manually controlled assembly operations. Generally tactile presentation and control of the fabric-to-be-joined is made to the joining, or sewing, head under manual control. One drawback of this application technique is that the technique is labor intensive; that is, a large portion of the cost for manufacture is spent on labor. To reduce cost, automated or computer-controlled manufacturing techniques have been proposed in the prior art.

The incorporated reference discloses a limp material handling system including a manipulating system for selectively manipulating one or more layers of limp material. The manipulating system includes a support assembly adapted to support the material on a reference surface. The manipulating system further includes a selectively operable fold assembly. The fold assembly is operative to grip a curvilinear region of the material, then to control the curvature of that gripped curvilinear region so that the region has a selected contour, and to selectively translate and rotate that gripped region to a selected location overlying an associated curvilinear region of the reference surface, and then the material is released. To fold the material, a lifting operation for the gripped region is interspersed with these operations. Then, that translated and/or rotated and/or configured curvilinear region is lowered to the underlying associated curvilinear region of the reference surface, or onto material overlying that associated curvilinear region on the reference surface.

More particularly, in accordance with the disclosure of incorporated reference, the material manipulation system for fabric on a support table, includes a controller, and the folding assembly. The folding assembly includes a controllable robot arm portion which is selectively movable along a reference axis perpendicular to the support table and selectively rotatable about that axis. The folding assembly includes an articulated assembly supporting a flexible spline extending along a deformable central axis parallel to the plane of the support table. That spline-supporting assembly includes three connected segments coupled in serial fashion. Each of the end segments is selectively rotatable with respect to the central segment, all under the control of the controller. The central segment is rotatable about the reference axis under the control of the controller. Each of segments includes a plurality of gripping elements distributed along the deformable central axis of the spline. In the incorporated reference, the spline is controlled generally to establish a desired orientation of gripping elements extending from the spline. Cubic or higher order spline curvatures may be achieved with this configuration.

It is an object of the present invention to provide an improved apparatus for controlling the shape of a flexible spline to substantially match a third order polynomial curve.

SUMMARY OF THE INVENTION

Briefly, the present invention is an apparatus for controlling the shape of an elongated flexible spline, for example of a folding assembly, to substantially match a third order polynomial curve of the form $$B_{SP}X + C_{SP}X^2 + D_{SP}X^3 = Y$$

extending between first and second end points and on the curve. The curve is defined, or measured, with respect to a spline coordinate system having intersecting and mutually perpendicular $X_{SP}$ and $Y_{SP}$ axes, wherein $B_{SP}$, $C_{SP}$ and $D_{SP}$ are predetermined constants. The spline extends along a deformable central axis in a plane parallel to the $X_{SP}$ and $Y_{SP}$ axes.

A spline support member extends along the central axis. The spline is pivotably coupled to the support member at a first point along said central axis, and is slidingly coupled to the support member at second, third and fourth points along the central axis. The support member establishes a first predetermined distance (L) along a reference line passing through the interior two of said first, second, third and fourth points.

A first spline deflector is adapted to selectively deflect one of the exterior two of the first, second, third and fourth points by a distance $D_L$ in a direction perpendicular to the reference line.

A second spline deflector is adapted to selectively deflect the other of the exterior two of the first, second, third and fourth points by a distance $D_R$ in a direction perpendicular to the reference line. A positioner, for example a controlled robot arm, is adapted to position the interior two points so that the reference line is angularly offset by an angle A with respect to the $X_{SP}$ axis, where A is relatively small.

A controller controls said positioner and the first and second spline deflectors so that the central axis of the spline is deformed and the intermediate two points substantially match points of the polynomial curve correspondingly positioned in the direction of the $X_{SP}$ axis, and so that the exterior two points are offset with respect to the reference line and the spline central axis overlies the first and second end points of said curve.

In the preferred form of the invention, the desired polynomial curve is bound by the first end point (0,0) and the second end point ($X_0$, 0) wherein said end point coordinates are measured with respect to the $X_{SP}$ and $Y_{SP}$ axes, and where $X_0$ is greater than L and less than 3L. The first point may be defined by coordinates ($X_1$, $Y_1$), the second point by coordinates ($X_2$, $Y_2$), the third point by ($X_3$, $Y_3$) and the fourth point by coordinates ($X_4$, $Y_4$), all of those coordinates being measured with respect to the $X_{SP}$ and $Y_{SP}$ axes. Preferably, the support member establishes a distance equal to the first predetermined distance (L) between each exterior one of the first, second, third, and fourth points and the adjacent interior one of the first, second, third and fourth points.

In one form, the one of the interior two points which has coordinates closer to (0,0) than the other of those interior points is the pivotably coupled point.

In that configuration the first spline deflector is adapted to deflect the exterior one of the points which is adjacent to the pivotably coupled point by a distance $D_L$ so that the distance ($V_L$) between said spline at $X_{SP}=0$ and the reference line is substantially equal to $$\left(\frac{4D_L - D_R}{15L^3}\right) X_L^3 + \left(\frac{4D_L - D_R}{5L^2}\right) X_L^2 - \left(\frac{7D_L + 2D_R}{15L}\right) X_L$$

The second spline deflector is adapted to deflect the other exterior point by a distance $D_R$ so that the distance ($V_R$) between the spline at $X_{SP}=X_0$ and the reference line is substantially equal to $$\frac{D_L - 4D_R}{15L^3} (X_R + L)^3 + \frac{8D_R - 2D_L}{5L^2} (X_R + L)^2 + \frac{11D_L - 29D_R}{15L} (X_R + L) + \frac{3D_R - 2D_L}{5}$$

In order to determine $D_L$ and $D_R$, the above expressions may be solved using the values:

$$V_R = (X_4 - X_3) \sin A + Y_2$$
$$X_R = X_4 - X_3 - Y_3 \sin A$$
$$V_L = Y_2 - X_2 \sin A$$
$$X_L = X_2 - Y_2 \sin A, \text{ and}$$
$$X_1 = 0, Y_1 = 0, X_4 = X_0 \text{ and } Y_4 = 0$$

In one form of the invention, the support member is a three element articulated member, which is articulated at each of the intermediate ones of first, second, third and fourth points. The first spline deflector includes a first driver affixed to the middle element of the support member at a point laterally offset from the central axis, and an associated link drivable by the first driver and coupled between the first driver and the end element of the support member associated with the one exterior point. The second spline deflector includes a second driver affixed to the middle element at a point laterally offset from the central axis and an associated link drivable by the second driver and coupled between the second driver and the end element of the support member associated with the second exterior point. The controller is adapted for selectively activating the first and second drivers to drive the associated links with respect to the middle element whereby the end elements are rotated with respect to the middle element to control the shape of the spline. The drivers may be stepper motors and the controller is adapted for applying control signals to the stepper motors.

With this configuration, the flexible spline may be used to support fabric gripping elements in the robot arm of the folder of an article assembly system. That system may efficiently construct seamed articles, such as garments, in a manner providing accurate and repeatable edge positioning, thereby leading to highly uniform quality of garment assembly. Particularly, the folding apparatus is well adapted to attaching to the limp material, picking that edge up, reshaping that edge to match a predetermined third order polynomial curve, and moving it and placing it down elsewhere on the surface with substantially high accuracy. The reshaping of the edge permits matching to another edge of material already on the surface, so that the overlying edges may be then joined to form a desired seam, thereby permitting joining of dissimilarly-shaped edges.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
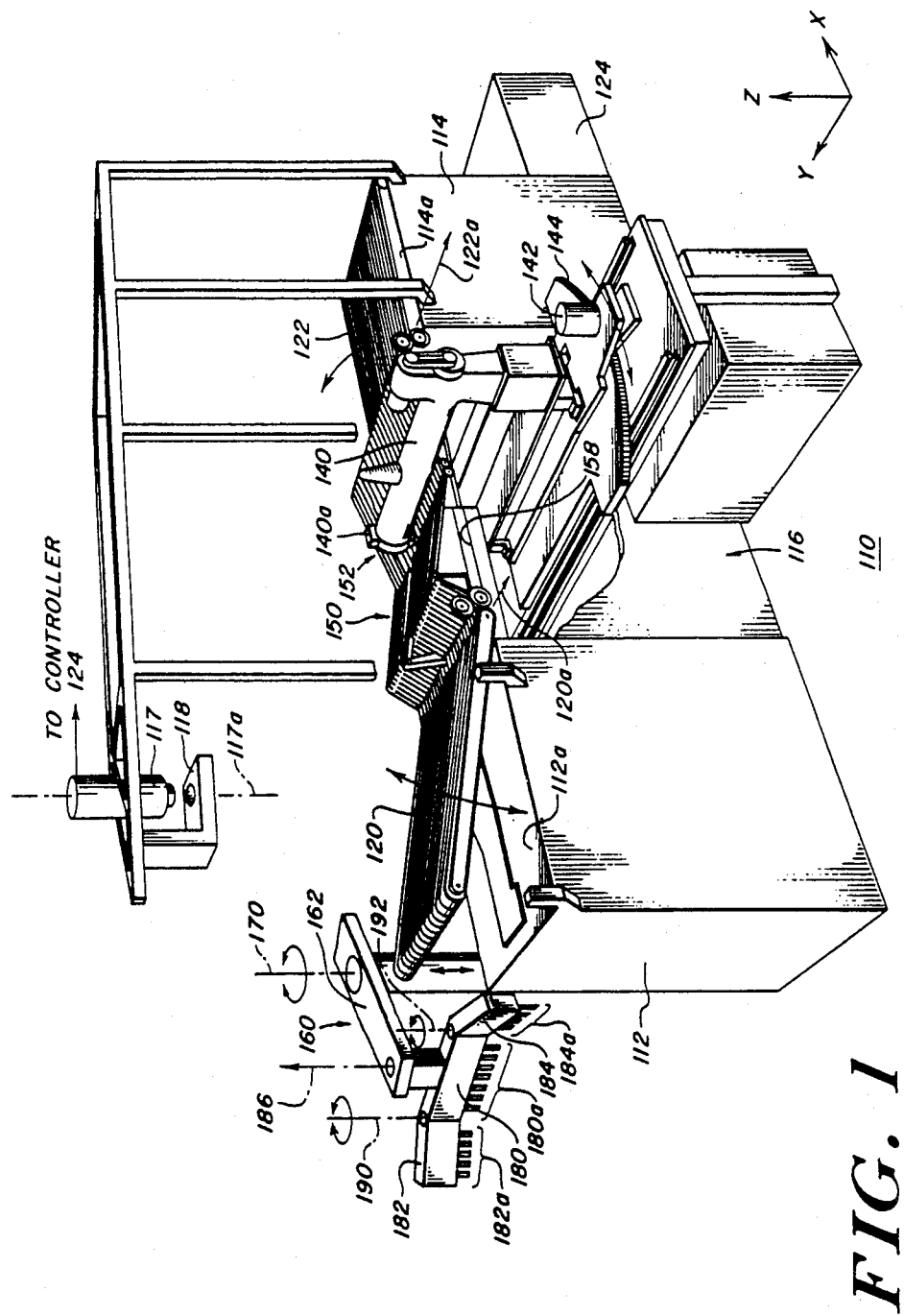
FIG. 1 shows an isometric representation of the principal elements of an exemplary embodiment of the present invention.
Figure 2:
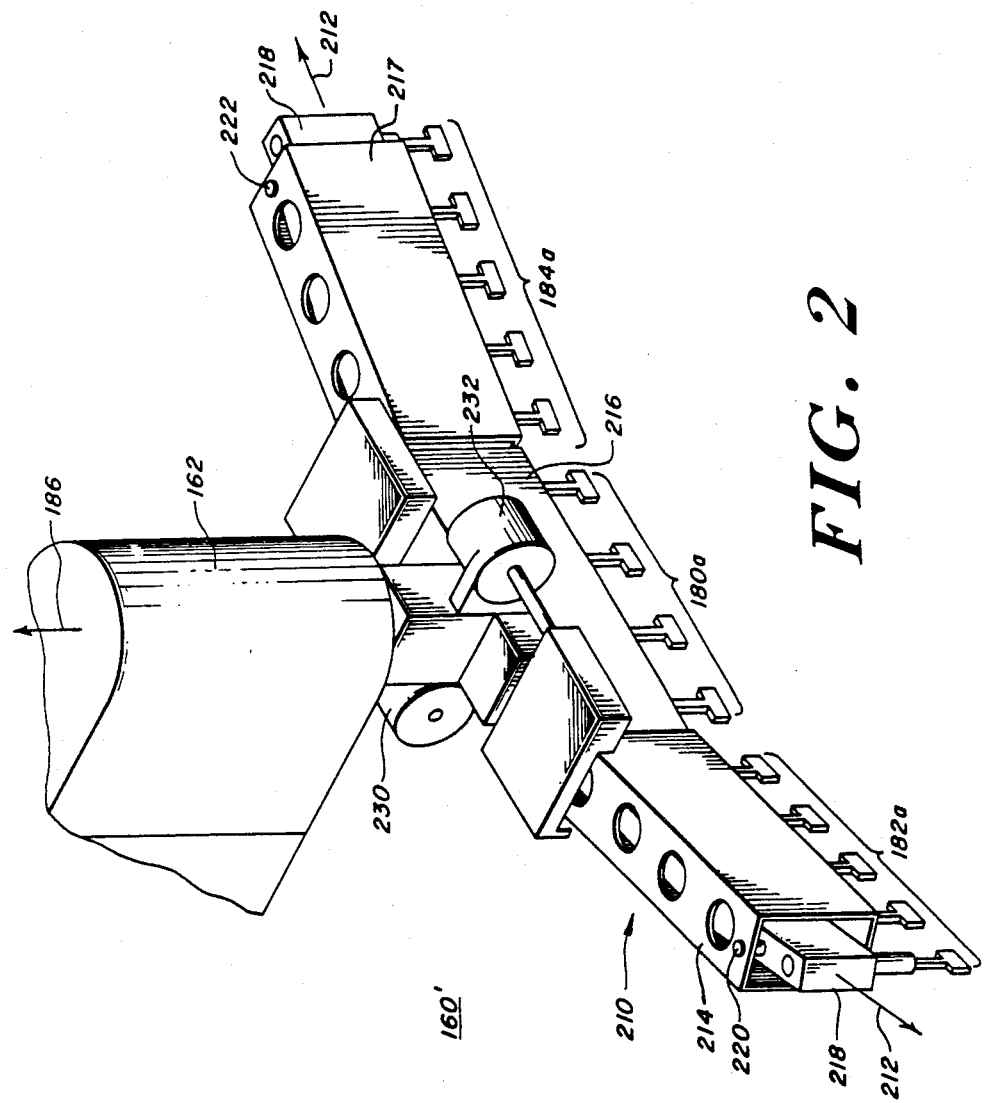
FIG. 2 shows an isometric representation of an exemplary fabric folding system for use with the system of FIG. 1.

FIG. 1 shows an isometric representation of the principal elements of a seamed article assembly system 110, together with a set of intersecting reference coordinate axes X, Y and Z. FIG. 2 shows an isometric representation of the principal elements of the folding assembly 160 embodying the present invention and adapted for use with the assembly system 110.

The system 110 generally has the form of, and operates in a similar manner to, the correspondingly numbered system described in U.S. patent application Ser. No. 707,608. The system 110 includes a vision system support table 112, a loading support table 114 and a seam joining assembly 116. The system 110 further includes an optical sensor system overlying table 112 and including a television camera 117 and a common-axis illumination system 118. In alternative forms, an additional optical sensor system may similarly overlie table 114, for use in loading or unloading and orienting limp material elements, for example. Each of the support tables 112 and 114 includes a respective one of planar upper surfaces 112a and 114a.

A set of parallel endless belts (120 and 122, respectively) is affixed to each of tables 112 and 114. Each set of belts 120 and 122 is pivotable about a respective one of axes 120a and 122a from a position substantially parallel to one of surfaces 112a and 114a (closed), as shown in FIG. 1, to a position substantially perpendicular to one of those surfaces (open). In FIG. 1, belt set 120 is shown in a partially open position, and belt set 122 is shown in a closed position substantially parallel to the top surface 114a of table 114. For loading limp material sections onto surface 114a, the belt assembly 122 is retracted to its full open position, thereby making the surface 114a fully available for receiving segments.

The system 110 further includes a material manipulation system for fabric on a support table. That manipulation system includes a controller 124, and a folding assembly 160. The folding assembly includes a controllable robot arm 160 which is selectively movable along a vertical axis 170 and selectively rotatable about that vertical axis 170. The folding assembly includes a hinged, linearly segmented assembly (180, 182, 184) supporting a flexible spline (not shown in FIG. 1) extending along a deformable central axis. That spline-supporting assembly includes three elongated segments 180, 182, 184. Each of the end segments 182, 184 is selectively rotatable with respect to the central segment 180 so that the orientation of those end segments are selectively controlled with respect to the angular orientation of central segment, all under the control of the controller 124. The central segment 180 is rotatable about the vertical axis 186 under the control of controller 124. Each of segments 180, 182, 184 includes a plurality of gripping elements distributed along the deformable central axis of the spline.

The gripping elements are denoted in FIG. 1 by reference designation 180a, 182a and 184a. Each of the gripping elements is adapted for selectively gripping regions of any fabric underlying those elements. The arm 162 is selectively controllable in the Z direction. As a result, when the gripping elements are affixed to a portion of the material, that portion may be selectively lifted and then lowered (in the Z direction) with respect to the surface 112a.

With this configuration, the folding assembly 160 may be used as a manipulator for material on surface 112a, whereby selective curvilinear portions of that material may be sequentially grabbed by the gripping elements, and then translated and/or rotated and/or reshaped, and then released. The folding assembly 160 may also be used as a material folder by selectively performing the operations described for the manipulator, interspersed with lifting and lowering operations, particularly as described in the incorporated reference.

In one form, each of the gripping elements may comprise a substantially tubular member coupling a vacuum thereto, which may be selectively applied. Alternatively, each of the gripping elements may include a grabber which comprises an elongated member extending along an axis perpendicular to the Z axis having a barb extending from the tip closest to the surface 112a. In the latter embodiment, the elongated member, or barbed needles, may be selectively reciprocated in the Z direction under the control of controller 124.

FIG. 2 shows the assembly 160 of FIG. 1. In that FIG. 2, corresponding elements are identified with identical reference designations. In FIG. 2, assembly 160 includes an elongated carrier assembly 210 supporting an elongated, flexible spline 218 having a deformable central axis 212 extending along its length. Axis 212 in a plane is substantially parallel to surface 112a. In the present embodiment, the spline 218 is positioned within a three element articulated support, or carrier, assembly 210. The carrier assembly 210 includes a hinged housing (including sections 214, 216 and 217) and a linkage to support spline 218 within that housing. The two ends of spline 218 are slidably coupled to housing segments 214 and 217 at points 220 and 222, respectively. The spline is also pivotably coupled to the sections 214 and 216 at the hinge axis of those sections and slidably coupled to sections 216 and 217 at the hinge axis of those sections, as described in more detail below. Forcers 230 and 232 are adapted to applying transverse forces to member 218 at points between the end points to control the curvature of spline 218 and its central axis 212. As the forcers 230 and 232 control the orientation of the axis 212, the gripping elements may be selectively displaced to provide the desired orientation of the gripping elements. This embodiment in effect provides a cubic spline. In other embodiments, differing numbers of forcers may be used. In the assembly 160, flexible cubic (or higher order) splines may be used to position the gripping elements supported by sections 214 and 217.

With configuration 160, the gripping elements may be selectively driven to form a desired curvilinear contour over a portion of material on the table 112a. The gripping elements 180a, 182a and 184a may be selectively lowered to the material on the table 112a so that those gripping elements may be activated to couple to (or "grab") the material at a corresponding curvilinear region of at least an uppermost layer of the fabric on the surface 112a. To partially accomplish folding, the assembly 160 may then be raised in the Z direction in a manner lifting that uppermost layer of the material.

The gripping elements may then be translated and/or rotated, and repositioned (to modify the curvature of axis 212) so that the grabbed region of the uppermost layer of material is repositioned to a selective location overlying a predetermined location over the surface 112a. The assembly 160 may then be lowered so that the lifted material is adjacent to the surface 112a or overlying the material on surface on 112a. All of this operation is under the control of controller 124. The vacuum at surface 112a holds the material in position when that material is adapted to surface 112a.

By selectively performing this operation over desired curvilinear regions of the material, a desired folding operation of the material may be attained, as set forth in the incorporated reference.

In practice, the particular desired polynomial curve to which the spline is to be matched may be programmed into the controller 124, or, for example, may be determined computationally from detected edge points (as determined by a vision system) along a desired contour. The contour to be matched may be determined as a third order, least squares fit of the edges of the material segment between two slope changes (or "breakpoints").

Figure 2A:
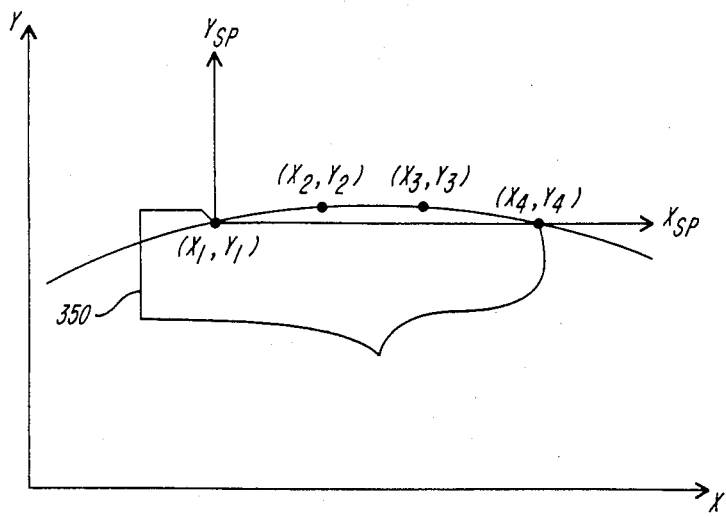
FIG. 2A shows a graphic representation of a material segment on a support table with respect to a table coordinate system and spline coordinate system.

FIG. 2A shows an exemplary limp material segment 350 positioned with respect to the X and Y coordinates of the support table 112a. Before the spline 218 is bent to match the desired contour, the contour may be transformed from the X-Y table coordinate system into the coordinate frame of the spline having $X_{SP}$ and $Y_{SP}$ axes. Initially, four points are selected in the table frame curve for transformation to the spline coordinate system. These points are transformed into the spline coordinate frame in accordance with:

$$\theta = \tan^{-1}\left(\frac{Y_{T4} - Y_{T1}}{X_{T4} - X_{T1}}\right)$$

$$\begin{bmatrix} \cos\theta & \sin\theta \\ -\sin\theta & \cos\theta \end{bmatrix} \begin{bmatrix} X_{Tn} - X_{T1} \\ Y_{Tn} - Y_{T1} \end{bmatrix} = \begin{bmatrix} X_n \\ Y_n \end{bmatrix}$$

$X_{T1}$, $Y_{T1}$—coordinates of breakpoint nearest to table frame origin $X_{T4}$, $Y_{T4}$—coordinates at breakpoint farthest from table origin $X_{Tn}$, $Y_{Tn}$—table frame coordinates for $n^{th}$ point $X_n$, $Y_n$—spline frame coordinates for $n^{th}$ point As a result of this transformation, points $(X_1,Y_1)$ and $(X_4,Y_4)$ are positioned along the $X_{SP}$ axis of the spline coordinate frame. Since, point $(X_1,Y_1)$ is also aligned with the $Y_{SP}$ axis, the $A_{SP}$ coefficient of (the generalized third order polynomial which defines the cloth contour) is zero:

$$A_{SP}+B_{SP}X_n+C_{SP}X_n^2+D_{SP}X_n^3=Y_n$$

where $A_{SP}=0$.

Coefficients $B_{SP}$, $C_{SP}$ and $D_{SP}$ are determined from:

$$\begin{bmatrix} X_2 & X_2^2 & X_2^3 \\ X_3 & X_3^2 & X_3^3 \\ X_4 & X_4^2 & X_4^3 \end{bmatrix} \begin{bmatrix} B_{SP} \\ C_{SP} \\ D_{SP} \end{bmatrix} = \begin{bmatrix} Y_2 \\ Y_3 \\ Y_4 \end{bmatrix}$$

Figure 3:
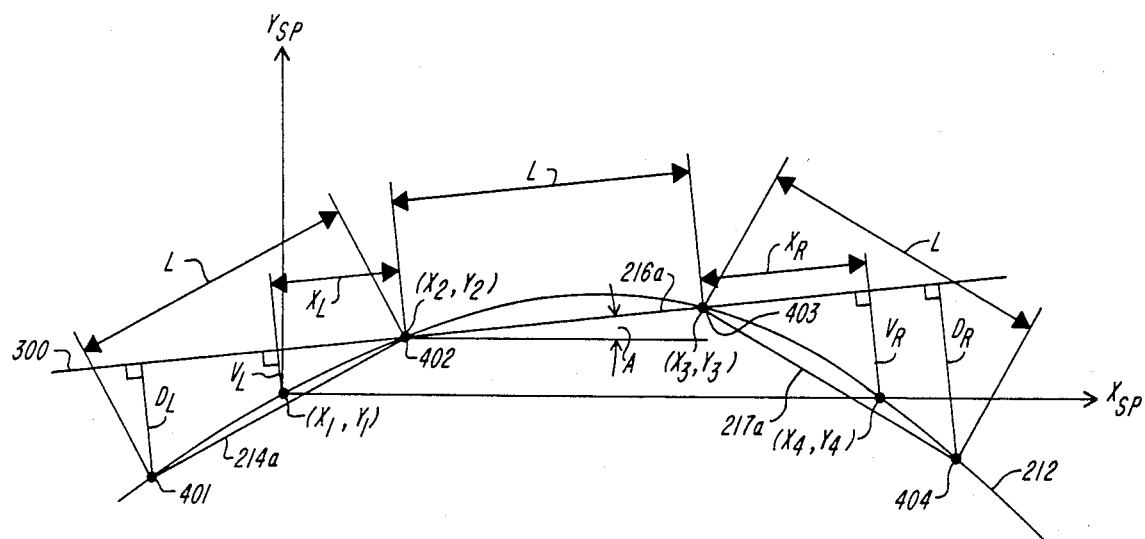
FIG. 3 shows a schematic representation of the flexible spline of FIG. 2 with respect to a third order polynomial curve-to-be-matched.

FIG. 3 shows in schematic form the central axis 212 of the spline 218 positioned in an overlapping relationship with a third order polynomial curve of the form:

$$B_{SP}X+C_{SP}X^2+D_{SP}X^3=Y$$

extending between endpoints $(X_1, Y_1)$ and $X_4, Y_4)$ and passing through intermediate points $(X_2, Y_2)$ and $(X_3, Y_3)$, all measured with respect to the spline coordinate system axes $X_{SP}$ and $Y_{SP}$. In FIG. 3, $X_1=0$, $Y_1=0$, $X_4=X_0$ and $Y_4=0$. The intermediate points $(X_2, Y_2)$ and $(X_3, Y_3)$ define the locus of a reference line 300 passing therethrough. Those intermediate points are separated by a predetermined distance L along the line 300. The line 300 is angularly offset by an angle A with respect to the $X_{SP}$ axis, where A is relatively small, such as approximately 10 degrees or less.

Also shown in FIG. 3, are first, second, third and successive points along the spline axis 212. The two exterior points are denoted by 401 and 404 and the two interior points are denoted by 402 and 403. The central axes of the elements 214, 216 and 217 are represented in FIG. 3 by line segments denoted by reference designations 214a, 216a and 217a, respectively.

In the present embodiment, the spline is pivotally coupled to the support members 214 and 216 at point 402 and slidingly coupled to the support member 214 at point 401. The spline 218 is slidingly coupled to the support members 216 and 217 at point 403 and slidingly coupled to the support member 217 at point 404. To effect the sliding coupling at points 401, 403 and 404, a pin (such as pin 220 for point 401) extends from the support element through an elliptical cross-section hole in spline 218, where the elliptical cross-section is eccentric in the direction of axis 212. The pivotal coupling at point 402 is effected by a pin (not shown) extending along the hinge axis between elements 214 and 216 through a circular cross-section hole in spline 218.

In operation, the robot arm 162 translates and rotates the mid-point of the spline support element 216 such that points 402 and 403 overlie selected points $(X_2, Y_2)$ and $(X_3, Y_3)$ respectively of the desired polynomial curve. Then, the stepper motors 230 and 232 act under the control of the controller 124 to angularly drive elements 217 and 214, respectively, with respect to the element 216 so that the central axis 212 of the spline 218 is deformed so that the points 402 and 403, of the spline substantially match points $(X_2, Y_2)$ and $(X_3, Y_3)$ of the desired polynomial curve and so that the points 401 and 404 are deflected so that the spline central axis 212 substantially passes through points $(X_1, Y_1)$ and $(X_4, Y_4)$ of the desired polynomial curve.

More particularly, the motor 232 (and associated linkage assembly) deflects point 401 of spline 218 by a distance $D_L$ with respect to the reference line 300 so that the distance $V_L$ from the spline 218 at $x=0$ to the reference line 300 is substantially equal to $$\left(\frac{4D_L - D_R}{15L^3}\right) X_L^3 + \left(\frac{4D_L - D_R}{5L^2}\right) X_L^2 -$$

$$\left(\frac{7D_L + 2D_R}{15L}\right) X_L$$

Similarly, the motor 230 (and associated linkage assembly) deflects the point 404 of spline 218 by a distance $D_R$ with respect to the reference line 300 so that the distance $V_L$ from the spline 218 at $X=X_0$ to the reference line 300 is substantially equal to $$\frac{D_L - 4D_R}{15L^3}(X_R + L)^3 + \frac{8D_R - 2D_L}{5L^2}(X_R + L)^2 +$$

$$\frac{11D_L - 29D_R}{15L}(X_R + L) + \frac{3D_R - 2D_L}{5}$$

The particular values for $D_L$ and $D_R$ are readily obtained from the solution of the above equations for $V_L$ and $V_R$ where $$V_R = (X_4 - X_3) \sin A + Y_2$$

$$X_R = X_4 - X_3 - Y_3 \sin A$$

$$V_L = Y_2 - X_2 \sin A$$

$$X_R = X_2 + Y_2 \sin A$$

and where $X_1=0$, $Y_1=0$, $X_4=0$ and $Y_4=0$.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Apparatus for controlling the shape of an elongated flexible spline to substantially match a third order polynomial curve of the form $$B_{SP}X+C_{SP}X^2+D_{SP}X^3=Y$$

extending between first and second end points and on said curve, said curve being measured with respect to a spline coordinate system having intersecting and mutually perpendicular $X_{SP}$ and $Y_{SP}$ axes wherein $B_{SP}$, $C_{SP}$ and $D_{SP}$ are predetermined constants, said spline extending along a deformable central axis in a plane parallel to said $X_{SP}$ and $Y_{SP}$ axes, comprising:

A. a spline support member extending along said central axis, and associated means for pivotably coupling said spline to said support member at a first point along said central axis, and means for slidingly coupling said spline to support member at second, third and fourth points along said central axis, wherein said support member establishes a first predetermined distance (L) along a reference line passing through the interior two of said first, second, third and fourth points, B. first spline deflector means for selectively deflecting one of the exterior two of said first, second third and fourth points by a distance $D_L$ in a direction perpendicular to said reference line, C. second spline deflector means for selectively deflecting the other of the exterior two of said first, second, third and fourth points by a distance $D_R$ in a direction perpendicular to said reference line, D. position means for positioning said interior two points whereby said reference line is angularly offset by an angle A with respect to said $X_{SP}$ axis, where A is relatively small, and E. controller means for controlling said position means and said first and second spline deflector means whereby said central axis of said spline is deformed so that said intermediate two points substantially match points of said polynomial curve correspondingly positioned in the direction of said $X_{SP}$ axis, and whereby said exterior two points are offset with respect to said reference line so that said central axis overlies said first and second end points of said curve.

2. Apparatus according to claim 1 wherein said polynomial curve is bound by said first end point (0,0) and the second end point ($X_0$,0) wherein said end point coordinates are measured with respect to said $X_{SP}$ and $Y_{SP}$ axes, and where $X_0$ is greater than L and less than 3L, and wherein said first point is defined by coordinates ($X_1$, $Y_1$), said second point is defined by coordinates ($X_2$, $Y_2$), said third point is defined by ($X_3$, $Y_3$) and said fourth point is defined by coordinates ($X_4$, $Y_4$), all said coordinates being measured with respect to said $X_{SP}$ and $Y_{SP}$ axes.

3. Apparatus according to claim 2 wherein said support member establishes a distance equal to said first predetermined distance (L) between each exterior one of said points and the adjacent interior one of said points.

4. Apparatus according to claim 3 wherein the one of said interior two points which has coordinates closer to (0,0) than the other of said interior points is said pivotably coupled point, and wherein said first spline deflector means is adapted to deflect the exterior one of said points which is adjacent to said pivotably coupled point by a distance $D_L$ so that the distance ($V_L$) between said spline at $X_{SP}=0$ and said reference line is substantially equal to $$\left(\frac{4D_L - D_R}{15L^3}\right) X_L^3 + \left(\frac{4D_L - D_R}{5L^2}\right) X_L^2 - \left(\frac{7D_L + 2D_R}{15L}\right) X_L$$

wherein said second spline deflector means is adapted to deflect the other exterior point by a distance $D_R$ so that the distance ($V_R$) between said spline at $X_{SP}=X_0$ and said reference line is substantially equal to $$\frac{D_L - 4D_R}{15L^3}(X_R + L)^3 + \frac{8D_R - 2D_L}{5L^2}(X_R + L)^2 + \frac{11D_L - 29D_R}{15L}(X_R + L) + \frac{3D_R - 2D_L}{5}$$

and wherein $V_R = (X_4 - X_3) \sin A + Y_2$ $X_R = X_4 - X_3 - Y_3 \sin A$ $V_L = Y_2 - X_2 \sin A$ $X_L = X_2 - Y_2 \sin A$.

and wherein $X_1=0$, $Y_1=0$, $X_4=X_0$ and $Y_4=0$.

5. Apparatus according to claim 4 wherein said support member is a three element articulated member, said member being articulated at each of the intermediate ones of said points, wherein said first spline deflector includes a first driver affixed to the middle element of said support member at a point laterally offset from said central axis, and an associated link drivable by said first driver and coupled between said first driver and the end element of said support member associated with said one exterior point, wherein said second spline deflector includes a second driver affixed to said middle element at a point laterally offset from said central axis and an associated link drivable by said second driver and coupled between said second driver and the end element of said support member associated with said second exterior point, and wherein said controller means includes means for selectively activating said first and second driver to drive said associated links with respect to said middle element whereby said end elements are rotated with respect to said middle element to control the shape of said spline.

6. Apparatus according to claim 5 wherein said drivers are stepper motors and said controller includes means for applying control signals to said stepper motors.

* * * * *